Patented Oct. 9, 1951

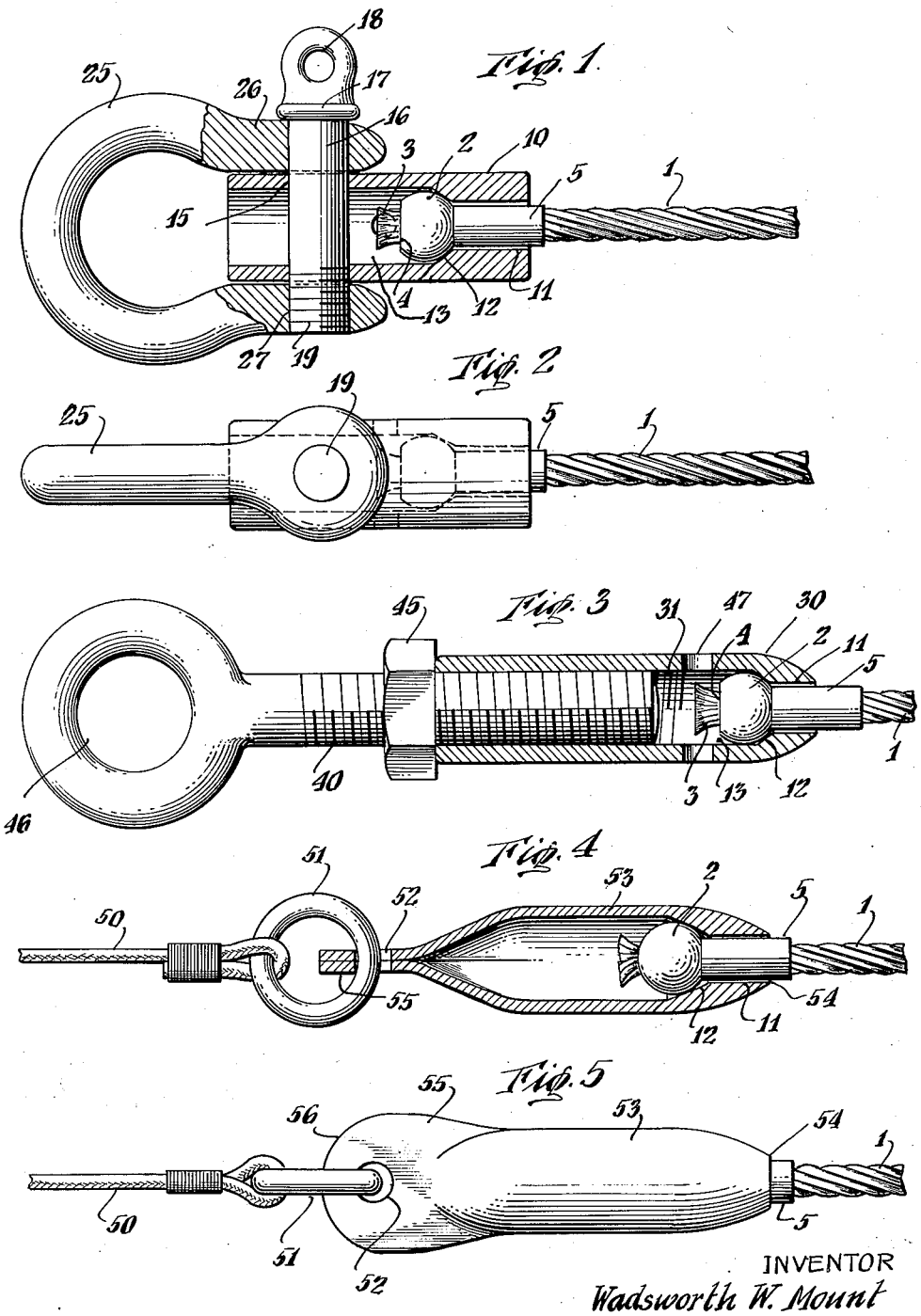

2,571,052

UNITED STATES PATENT OFFICE 2,571,052

SWIVEL TERMINAL FOR CABLES

Wadsworth W. Mount, Summit, N. J., assignor to Intertype Corporation, Brooklyn, N. Y., a corporation of New York Application June 9, 1945, Serial No. 598,620

2 Claims. (Cl. 287—82)

1

The invention relates to swivel connections for wire cable and more particularly to a new and useful combination ball type anchor terminal and swiveling connector or coupler for such cable.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a side elevation with parts in section showing an embodiment of the invention applied to a shackle;

Fig. 2 is a side elevation of the construction shown in Fig. 1;

Fig. 3 is a side elevation, with parts in section, of a modification of the invention applied to a threaded coupling or turnbuckle;

Fig. 4 is a similar view to Fig. 5 of a different form of the invention applied for attachment of the cable to a line; and Fig. 5 is a side elevation of the construction shown in Fig. 4.

An object of the invention is to provide a novel cable connector which on the one hand permits free swiveling movement of the cable relative thereto without the possibility of cutting or harming the wires forming the cable and which, on the other hand, provides for attachment or anchorage to a large variety of couplings or fittings employed in the many fields where wire cable is used.

Another object of the invention is to provide an improved swivel terminal for a wire cable which is simple and cheap to manufacture, yet embodies such precision in the form and cooperative relation between the parts involved as to afford much greater functional utility than heretofore and remarkably improved convenience and economy of application and manipulation.

In the preferred form of the invention a ball terminal is provided, as by swaging, at the end of the cable and from said terminal, preferably integral with the ball, is provided an elongated shank which is preferably cylindrical and extends along the cable for a distance sufficient to prevent contact of the latter with a sleeve or other coupling member constructed to encircle the ball-and-shank terminal and to provide inside the sleeve a smooth bearing surface or seat for the ball. The seat in the sleeve member alluded to is preferably tapered or conical so as to provide for minimum surface contact between it and the ball, thus enabling the ball and the shank and cable securely fastened thereto to turn freely under moderate loads and of course with full freedom when tension is released.

The sleeve or other coupling in which the ball at the end of the cable is mounted for swiveling movement is itself designed for attachment to various forms of connections or anchorages which are preferably so constructed that the ball cannot move a great distance from the seat in which it has its swiveling connection. Various illustrative forms of such sleeve and connections therewith are shown in the application but it will be understood that the invention is not limited to any particular form of device for attachment to the sleeve.

It will be understood that the foregoing general description and the following detailed description as well are exemplary and explanatory but are not restrictive of the invention.

Referring now in detail to the present preferred embodiment of the invention illustrated by way of example in the accompanying drawings, there is shown in Fig. 1 the cable 1 formed of a plurality of twisted strands of wire in accordance with common steel cable manufacturing practice. Said cable is provided adjacent its end with a terminal ball 2, said ball being fixed to the cable by swaging and the terminal wires of the cable projecting beyond the end of the ball are preferably swaged together and shaped to form a solid enlarged mass at 3. Preferably the terminal face of the ball 2 is cut away to form a flat surface 4. An elongated shank 5, preferably formed integrally with the ball, and of a length so as to extend a substantial distance along and about the cable 1 is provided as shown. Said shank may also be swaged to the cable and attached thereto with the ball by a single swaging operation. The length of the shank 5 will depend upon the form of sleeve or coupling attachment desired for the cable, it being important however that said shank extend beyond the end of any surrounding coupling or sleeve in which the ball 2 may be seated, as shown.

In accordance with the invention a hollow coupling, such as the cylinder sleeve 10, is provided for housing the ball end of the cable and permitting swiveling action with respect thereto. For this purpose the base or cable end of the sleeve 10 is provided with a bore 11 which surrounds the shank 5 with sufficient clearance for slight lateral play of the shank and free turning thereof. The bore 11 at its inner end intersects an outwardly tapered base 12 providing a seat or bearing for free rotational movement thereupon of the ball 2 within the sleeve, the base 12 being formed at the inner end of an enlarged bore 13 extending from the opposite end of the sleeve, as shown, and of a size to freely accommodate the ball which is somewhat larger than its shank.

The angle of inclination of the base 12 is preferably so related to the curvature of the ball 2 that at no time can the ball bear against the sharp annular edge or line of intersection of the bore 11 with the base 12. The importance of this arrangement will be apparent from the fact that should the ball under a heavy load be allowed to bear against the sharp edge referred to, a severe wearing and binding action would result from the tendency to blunt and roll this sharp edge inwardly and the intended free swiveling action would then be lost. In a device of the proportions shown in Fig. 1, an angle for the base 12 of 40° to the longitudinal axis of the sleeve has been found most effective.

As will be clear from the drawing, the shank 5 is of a length substantially greater than that of the bore 11 so that the outer or terminal portion of the shank 5 projects a substantial distance beyond the base of the cylinder or sleeve 10. By this means one of the objectives of the invention is attained, that is protection against cutting and fraying of the wires of the cable, it being apparent that the shank 5 extending through the bore 11 and beyond the end of the sleeve 10 acts as a shield or guard against contact of the cable with the wall of the bore or the end of the sleeve. In this connection it may be noted that even when the cable is unloaded and relaxed so that the ball-and-shank terminal is free to slide inwardly in the bore 11 the cable will not be subject to contact with the sleeve. Also it will be observed that when the sleeve is coupled, for example, with a fitting 25 as herein shown and later described, there is very little freedom for inward movement of the ball-and-shank terminal away from the seat 12. This arrangement is purposeful and advantageous for certain applications of the invention in order to limit in-and-out play of the terminal whenever the cable may spin axially as it actually does upon sudden release of surging or changing loads.

In Figs. 1 and 2 there is shown one form of adaptation of the invention to a shackle construction. For this purpose the sleeve 10 is provided with a transverse bore or aperture 15 for the passage and reception of the pin 16 of a shackle. That bore 15 is preferably placed so that the shackle pin 16 will lie a distance beyond the terminal end 3 of the cable so as to permit freedom of rotation of the ball and a slight axial or longitudinal movement of the cable which may be desired in some cases. However, the passage of the pin 16 through the bore 15 also effectually provides a bar against too great longitudinal movement or escape of the cable ends out of the opposite end of the sleeve 10. As shown, the pin 16 is preferably cylindrical and smooth throughout the major part of its length, being provided at one end with a head having a base or collar 17 having an eye 18 formed therein, while the opposite end 19 is threaded as shown. The pin is adapted to hold in position the yoke or eye portion 25 of the shackle as shown. The arm 26 of the yoke is apertured to permit passage of the pin 16, while the opposite arm is apertured and threaded at 27 to receive the threaded end 19 of the pin. Thus the pin and the yoke turn together in the bore 15 to permit swiveling of the shackle with respect to the sleeve 10.

It will be recognized that the above-described construction is adapted for numerous uses in various arts where it is desired to attach a cable to a shackle connection or the like. One instance of such connection, where the strength of the cable terminal and the nature of its speed are important is in the attachment of the end of a wire cable to a projectile, as disclosed for example in my copending application Ser. No. 592,698, filed May 8, 1945, now Patent No. 2,522,685 dated September 19, 1950.

Referring now to Fig. 3, the cable ball end 2 and shank 5 are shown seated in a sleeve 30 of a turnbuckle. The cable-end portion of said sleeve comprising the bore 11, the tapered base 12 and the open sleeve portion 13 are constructed substantially identically with the corresponding parts described in Fig. 1. However, said sleeve 30 is provided beyond those parts with an internal threaded portion 31 which will serve for attachment of any desired threaded connectors, such as the take-up eye bolt 40 as shown. The threaded shank of said eye bolt 40 may be screwed into the sleeve to any desired depth, leaving, if desired, a short clearance between its end and the end 3 of the cable for the reasons previously described. The bolt 40 may be held at any desired point within the sleeve 30 by means of a clamp nut 45 threaded thereabout and clamped against the outer end of the sleeve 30. A rounded eye 46 is shown formed at the end of the bolt 40 for connection to any suitable attachment as may be required in use of cables such as airplane construction or on board ship or any other suitable use to which such devices may be put. A transverse bore 47 may be provided in sleeve 30 just beyond the end of the cable for turning of the sleeve to take up slack when the eye is fixed, this being accomplished by inserting a pin in said bore so as to turn the sleeve without clamping or marring the fitting. Said bore also helps to prevent corrosion of the fitting by letting water escape and dry air enter.

In so using the device of Fig. 3 as a turnbuckle, it is necessary to hold the cable from twisting while screwing up the sleeve on bolt 40, especially when the cable is under tension with respect to its seat 12. In order to facilitate holding the cable as desired, the shank 5 of the ball terminal is allowed to extend a substantial distance beyond the end of the bore 11 of the sleeve so that a wrench can be applied to the shank to hold it and the cable from twisting while the sleeve is being tightened on the bolt. In this operation, the shank 5 forms a protective covering for the cable and avoids damage to the wires thereof by the wrench.

One advantage of the invention, particularly with relation to the sleeve constructions 10 and 30 shown in Figs. 1, 2 and 3, is that such sleeves constitute simple screw machine products made with maximum simplicity and a minimum number of operations, all of which can be performed on a screw machine.

Referring now to the form of the invention shown in Figs. 4 and 5, same is particularly designed to provide a highly stream-lined swivel connection for the wire cable leader used in deep sea fishing. As shown, a fishing line 50 is suitably tied to a terminal ring 51 which is linked through an opening 52 at one end of the shaped housing 53. The opposite end of said housing is designed to receive the ball terminal 2 of the cable 1 as shown. Said cable-receiving portion of the housing 53 is internally bored at 11 to receive the cable terminal shank as previously described and a tapered base 12 for rotatably seating the ball 2 is similarly provided. The main body portion of the housing 53 is hollow and cylindrical, tapering at the bored end to an external diameter 54 close to that of the shank 5. The opposite or line end of the housing 53 merges into a flattened portion 55 which is apertured to provide the ring connection 52 and the end 56 thereof is arcuate to fit within the ring and provide a stream-lined shape overall.

By virtue of the construction described, the attachment of the wire cable leader 1 to the fishing line 50 is one which will not cause "bubbling" or erratic movements as the line is drawn through the water in trolling. Such bubbling and erratic movements frequently attract the fish and cause them to strike at the point of attachment of the leader instead of at the lure and hook carrried at the other end of the leader. Furthermore, the swivel connection for the ball and shank cable leader terminal permits the leader to rotate freely and thus avoid possible unwrapping or unwinding of the cable due to the twisting action of the water on the line and cable as they draw through it. By means of the invention the lure hangs free and no twisting or rotational effect is imparted to it from the twisting motion of the line being drawn through the water. The invention also avoids kinking of the leader due to turning and twisting against the line, such kinks being a frequent cause of weakening and breakage with a heavy fish.

The invention in its broader aspects is not limited to the specific mechanisms shown and described but departures may be made therefrom within the scope of the accompanying claims without departing from the principles of the invention and without sacrificing its chief advantages.

What I claim is:
1. A swivel anchor connection for cable including in combination, a terminal member comprising a rounded base and a swaged shank of smaller size extending along the cable from said terminal member, the portion of the cable passing through the terminal member being nowhere of greater diameter than the original cable outside the terminal member and depending upon the swaged contact for adherence to said terminal member, an elongated sleeve bored longitudinally from opposite ends to diameters respectively for receiving and accommodating the rounded base and its shank for axial rotation relatively to said sleeve, and a bearing surface joining the respective bores in the sleeve and providing a smooth bearing seat for said rounded base, said surface being formed within the sleeve at a point spaced from the shank receiving end thereof a distance less than the length of said shank, the terminal member being freely rotatable within the sleeve at all times, a transverse bore extending through both walls of the sleeve, a shackle-pin mounted in said bore and pivotally supporting a shackle outside the sleeve, said bore being adjacent the inner end of the base, and the total length of the sleeve being not substantially greater than twice the length of the portion of the terminal member within the sleeve.

2. A swivel anchor connection for cable including in combination, a terminal member comprising a rounded base and a swaged shank of smaller size extending along the cable from said terminal member, the portion of the cable passing through the terminal member being nowhere of greater diameter than the original cable outside the terminal and depending upon swaged contact for adherence to said terminal member, an elongated sleeve bored longitudinally from opposite ends to diameters respectively for receiving and accommodating the rounded base and its shank for axial rotation relatively to said sleeve, and a bearing surface joining the respective bores in the sleeve and providing a smooth bearing seat for said rounded base, said surface being formed within the sleeve at a point spaced from the shank receiving end thereof a distance less than the length of said shank, the terminal member being freely rotatable within the sleeve at all times, a transverse bore extending through both walls of the sleeve, a shackle-pin mounted in said bore and pivotally supporting a shackle outside the sleeve.

WADSWORTH W. MOUNT.

REFERENCES CITED

The following references are of record in the file of this patent:

UNITED STATES PATENTS

| Number | Name | Date |
|---|---|---|
| 734,664 | Brittan | July 28, 1903 |
| 819,092 | Smith | May 1, 1906 |
| 1,333,962 | Burke | Mar. 16, 1920 |
| 1,403,553 | Horn | Jan. 17, 1922 |
| 1,655,536 | Dumm | Jan. 10, 1928 |
| 2,010,853 | Dyer | Aug. 13, 1935 |
| 2,346,412 | Bratz | Apr. 11, 1944 |
| 2,375,548 | Gilmore | May 8, 1945 |
| 2,387,599 | Miller et al. | Oct. 23, 1945 |